United States Patent
Harp et al.

(10) Patent No.: US 9,550,122 B2
(45) Date of Patent: Jan. 24, 2017

(54) SYSTEM AND METHOD FOR DYNAMICALLY DETERMINING PATHS BETWEEN DESTINATIONS IN A VIRTUAL SPACE

(75) Inventors: Derek Harp, San Mateo, CA (US); Bengt Gregory-Brown, Springfield, OH (US); Pat N. Savelli, Dayton, OH (US); James J. Hooker, Beavercreek, OH (US)

(73) Assignee: MASLOW SIX ENTERTAINMENT, INC., San Mateo, CA (US)

( * ) Notice: Subject to any disclaimer, the term of this patent is extended or adjusted under 35 U.S.C. 154(b) by 993 days.

(21) Appl. No.: 13/079,471

(22) Filed: Apr. 4, 2011

(65) Prior Publication Data
US 2012/0252569 A1 Oct. 4, 2012

(51) Int. Cl.
*A63F 13/00* (2014.01)
*A63F 13/358* (2014.01)
*A63F 13/69* (2014.01)

(52) U.S. Cl.
CPC .............. *A63F 13/358* (2014.09); *A63F 13/69* (2014.09); *A63F 2300/64* (2013.01); *A63F 2300/8082* (2013.01)

(58) Field of Classification Search
CPC .......... A63F 13/00; A63F 13/55; A63F 13/56; A63F 13/822
USPC ....................................... 463/29, 1; 701/209
See application file for complete search history.

(56) References Cited

U.S. PATENT DOCUMENTS

| | | | |
|---|---|---|---|
| 6,678,876 B2 * | 1/2004 | Stevens | G06F 17/5077 716/126 |
| 6,862,727 B2 * | 3/2005 | Stevens | G06F 17/5077 716/126 |
| 2004/0143852 A1 | 7/2004 | Meyers | 725/133 |
| 2007/0198178 A1 * | 8/2007 | Trimby | G06N 5/003 701/533 |
| 2007/0254741 A1 | 11/2007 | Lim et al. | 463/42 |
| 2009/0291761 A1 | 11/2009 | Hata | 463/42 |

OTHER PUBLICATIONS

"Salvatore's Called a Meeting" www.gta.wikia.com.*
Oregon Trail—Classic Gaming, Apple II, Game of the Week, by Fragmaster, copyright 1996-2010, IGN Entertainment, Inc., 5 pages.
File: OregonTrailScreenshot.png, from Wikipedia, printed Jun. 4, 2010, 2 pages.
File: Oregontrail03.gif, from Wikipedia, printed Jun. 4, 2010, 2 pages.

* cited by examiner

*Primary Examiner* — David L Lewis
*Assistant Examiner* — Eric M Thomas
(74) *Attorney, Agent, or Firm* — Pillsbury Winthrop Shaw Pittman LLP

(57) ABSTRACT

A system may be configured to host a virtual space for access by users. The virtual space may be a game space in which users control one or more characters (or sets of characters) to achieve game objectives. The system may be configured such that the travel paths within the virtual world are determined dynamically. This may provide for travel which may have dynamic aspects at a lower cost than providing full interactivity between destinations.

21 Claims, 5 Drawing Sheets

SYSTEM AND METHOD FOR DYNAMICALLY DETERMINING PATHS BETWEEN DESTINATIONS IN A VIRTUAL SPACE

FIELD OF THE INVENTION

The invention relates to hosting a virtual space having discrete and separate destinations with paths between the destinations being determined dynamically to enhance replay and/or continuous play by users.

BACKGROUND OF THE INVENTION

Computer games in which a virtual space is divided into discrete places are known. Travel between the separate places by a user character may be accomplished with limited interactivity by the user character during travel. In such games, or environments, travel between destinations may be experienced by the user character as if the user character has "jumped", or teleported, from one location to another. Another example, may include a path between destinations in which the user character may travel along a narrow path having little to no interaction with the virtual space between the destinations.

Typically, this device of splitting the virtual space into separate places may be utilized to provide individual locations with deep interactivity. Travel between the separate places may be accomplished in this somewhat disjointed manner to limit the cost (e.g., in bandwidth, storage, processing, and/or other resources) associated with the regions between the separate places.

SUMMARY

One aspect of the invention relates to a system and method for providing a virtual space to users with dynamic travel between destinations in the virtual space. The travel is made dynamic by dynamic determination of travel paths between destinations. This includes dynamically determining nodes to insert in a path between destinations so that the path between destinations may differ for different trips between the destinations. Making travel dynamic by dynamically including nodes between destinations may enhance replay and/or constant play by users without the costliness of full interactivity in the virtual space between destinations.

A system configured to host a virtual space to a client computing device for interaction by a user may include a server having one or more processors configured to execute computer program modules. The computer program modules may comprise one or more of a destination node module, a dynamic node module, a travel interface module, a path module, and/or other modules.

The destination node module may be configured to instance destination nodes within the virtual space. Destination nodes in the virtual space may be formed as separate and discrete virtual places within the virtual space. The destination nodes module (and/or the other computer program modules) may be configured such that user characters cannot travel directly between the separate virtual places formed by the destination nodes. Instead, the virtual places formed by the destination nodes may be distributed within the virtual space such that certain destination nodes may be connected by potential paths. As such, a given destination node may be connected for travel by user characters with a subset of the other destination nodes by potential paths running between them. One or more of the potential paths may be unlockable. A potential path may be unlockable based on gameplay, a temporal parameter, a purchase, a virtual item or object that is being used and/or is available to the user character, and/or based on other criteria.

The destination node module may be configured such that responsive to a user character associated with a client computing device being located at a particular destination node, the destination node module may implement the instance of the particular destination node to determine a view of the particular destination node for presentation to the user via the client computing device. The destination nodes may include a first destination node, a second destination node, and/or other destination nodes.

The dynamic node module may be configured to instance dynamic nodes within the virtual space. Similar to the destination nodes, the dynamic nodes may form separate virtual places within the virtual space. The dynamic node module may be configured to implement the instances of the dynamic nodes to determine views of the dynamic nodes for presentation to user via the client computing devices, similar to the operation of the destination node module with respect to the destination nodes. Unlike destination nodes, dynamic nodes may not be connected with the destination nodes by potential paths. Instead, dynamic nodes may be dynamically and selectively included in the paths between the destination nodes, as is discussed further herein.

One or more of the dynamic nodes may be unlockable. A dynamic node may be unlockable based on gameplay, a temporal parameter, a purchase, a virtual item or object that is being used and/or is available to the user character, and/or based on other criteria.

A given dynamic node may include an objective to be completed by a player character. Progress through the dynamic node toward a destination node may be impeded until the objective has been performed. The objective may include one or more of collection of an item or items, defeat of an opponent or opponents, solving a puzzle, acquiring a skill, interacting with a character, or object(s), construction of one or more objects, use of specific language, removal/damaging/destruction/loss of one or more items, specific timed moments in the game story to coincide with game based events, gaining high enough advancement within the game, finding an item(s) or information, and/or other objectives.

The travel interface module may be configured to receive selection or entry by the users of travel commands. The travel commands may be received via a user interface presented to the users on the client computing devices. A travel command from a user may indicate that a user character associated with the user (and/or the client computing device associated with the user) should travel between the destination nodes. For example, a first travel command may indicate that a user character should travel between the first destination and the second destination.

The path module may be configured to dynamically determine paths between the destination nodes. This may include dynamically determining the dynamic nodes to be included in paths between the destination nodes. For example, responsive to the first travel command, the path module may be configured to dynamically determine a first set of dynamic nodes to be included in the path of the user character between the first destination node and the second destination node. Then, in order for the user character to pass from the first destination node to the second destination node, the user character may first proceed through the dynamic nodes included in the first set of dynamic nodes.

However, on subsequent trips between the first destination node and the second destination node, a different set of dynamic nodes may be included in the path between the first destination node and the second destination node.

The path module may be configured to dynamically determine which dynamic nodes to include in a path between destination nodes based on one or more parameters. The one or more parameters may include a parameter associated with a user character, a parameter associated with a user controlling the user character, a parameter associated with the client computing device being used by the user, a temporal parameter, a random parameter, and/or other parameters.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
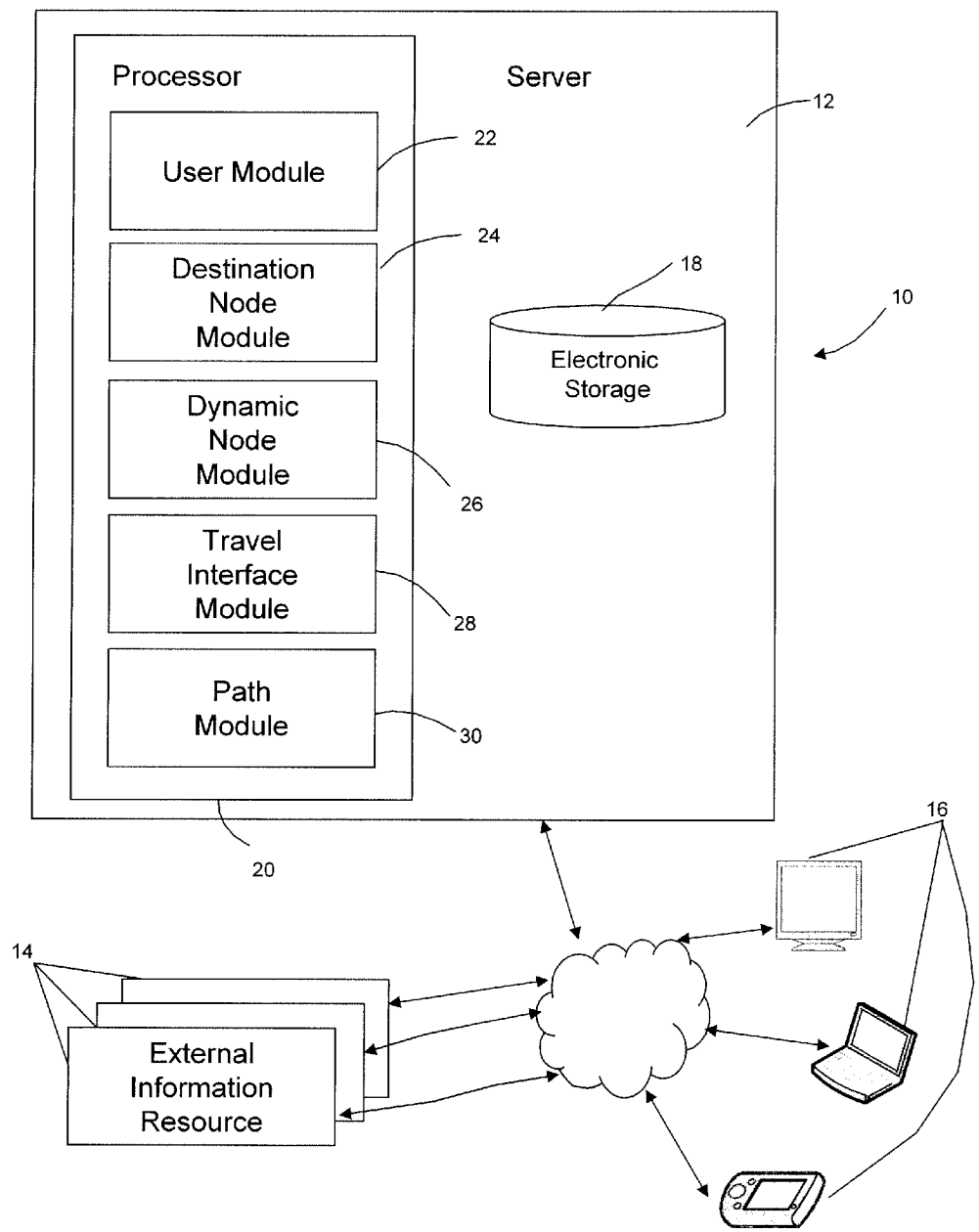
FIG. 1 illustrates a system configured to host a virtual space for access by users, in accordance with one or more embodiments of the invention.

FIG. 1 illustrates a system 10 configured to host a virtual space for access by users. The virtual space may be a game space in which users control one or more characters (or sets of characters) to achieve game objectives. The system 10 may be configured such that the travel paths within the virtual world are determined dynamically. This may provide for travel which may have dynamic aspects at a lower cost than providing full interactivity between destinations.

In some implementations, system 10 may include one or more servers 12, and/or other components. The system 10 may operate in communication and/or coordination with one or more external resources 14. Users may interface with system 10 and/or external resources 14 via client computing platforms 16. The components of system 10, servers 12, external resources 14, and/or client computing platforms 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, external resources 14, and/or client computing platforms 16 may be operatively linked via some other communication media.

A given client computing platform 16 may include one or more processors configured to execute computer program modules. The computer program modules may be configured to enable one or more users associated with the given client computing platform 16 to interface with system 10 and/or external resources 14, and/or provide other functionality attributed herein to client computing platforms 16. By way of non-limiting example, the given client computing platform 16 may include one or more of a desktop computer, a laptop computer, a handheld computer, a NetBook, a Smartphone, a gaming console, and/or other computing platforms.

The external resources 14 may include sources of information, hosts and/or providers of virtual environments outside of system 10, external entities participating with system 10, and/or other resources. In some implementations, some or all of the functionality attributed herein to external resources 14 may be provided by resources included in system 10.

The server 12 may be configured to provide, or cooperate with client computing platforms 16, to provide a virtual space to users. This may include hosting, serving, and/or otherwise providing the virtual space. The virtual space may be associated with a videogame which is played by the users via client computing platforms 16. The server 12 may include electronic storage 18, one or more processors 20, and/or other components. The server 12 may include communication lines, or ports to enable the exchange of information with a network and/or other computing platforms.

Electronic storage 18 may comprise electronic storage media that electronically stores information. The electronic storage media of electronic storage 18 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 18 may store software algorithms, information determined by processor 20, information received from server 12, information received from client computing platforms 16, and/or other information that enables server 12 to function properly.

Processor(s) 20 is configured to provide information processing capabilities in server 12. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination.

As is shown in FIG. 1, processor 20 may be configured to execute one or more computer program modules. The one or more computer program modules may include one or more of a user module 22, a destination node module 24, a dynamic node module 26, a travel interface module 28, a path module 30, and/or other modules. Processor 20 may be configured to execute modules 22, 24, 26, 28, and/or 30 by software; hardware; firmware; some combination of software, hardware, and/or firmware; and/or other mechanisms for configuring processing capabilities on processor 20.

It should be appreciated that although modules 22, 24, 26, 28, and 30 are illustrated in FIG. 1 as being co-located within a single processing unit, in implementations in which processor 20 includes multiple processing units, one or more of modules 22, 24, 26, 28, and/or 30 may be located remotely from the other modules. The description of the functionality provided by the different modules 22, 24, 26, 28, and/or 30 described below is for illustrative purposes, and is not intended to be limiting, as any of modules 22, 24, 26, 28, and/or 30 may provide more or less functionality than is described. For example, one or more of modules 22, 24, 26, 28, and/or 30 may be eliminated, and some or all of its functionality may be provided by other ones of modules 22, 24, 26, 28, and/or 30. As another example, processor 20 may be configured to execute one or more additional modules that may perform some or all of the functionality attributed below to one of modules 22, 24, 26, 28, and/or 30.

It will be appreciated that the illustration of modules 22, 24, 26, 28, and/or 30 being executed solely on processor 20 separate from client computing platforms 16 is not intended to be limiting. For example, in some implementations, the client computing platforms 16 may be configured to provide locally at least some of the functionality attributed above to one or more of modules 22, 24, 26, 28, and/or 30. Similarly, one or more of modules 22, 24, 26, 28, and/or 30 may be executed locally on individual client computing platforms 16 while others are executed on server 12.

The user module 22 may be configured to access and/or manage one or more user profiles and/or user information associated with users of the system 10. The one or more user profiles and/or user information may include information stored by electronic storage 18, one or more of the client computing platforms 16, and/or other storage locations. The user profiles may include, for example, information identifying users (e.g., a username or handle, a number, an identifier, and/or other identifying information) within the virtual space, security login information (e.g., a login code or password), virtual environment account information, subscription information, virtual currency account information (e.g., related to currency held in credit for a user), friend information (e.g., information related to friends of a user), virtual space usage information, demographic information associated with users, interaction history among users in the virtual space, information stated by users, purchase information of users, browsing history of users, a client computing platform identification associated with a user, a phone number associated with a user, and/or other information related to users.

The destination node module 24 may be configured to instance destination nodes within the virtual space. The destination nodes may be arranged in the virtual space in accordance with a virtual map. The destination nodes may be instanced as separate "places" within the virtual space. As such, a user character controlled by a user (e.g., via client computing platform 16) may not be able to move freely between the destination nodes without traveling along a path (e.g., as described below). The destination node module 24 may be configured to implement the instances of the destination nodes to determine views of the destinations nodes. The views may then be communicated (e.g., via streaming, via object/position data, and/or other information) from subject 12 to client computing platforms 16 for presentation to users. The view determined and transmitted to a given client computing platform 16 may correspond to a user character being controlled by a user via the given client computing platform 16.

Places within the virtual space formed by the destination nodes may individually comprise simulated spaces (e.g., similar to a physical space) that is accessible by users via clients (e.g., client computing platforms 14) that present the views of the virtual space to a user. The simulated space of a given destination node (or dynamic node discussed herein) may have a topography, express ongoing real-time interaction by the user, and/or include one or more objects positioned within the topography that are capable of locomotion within the topography. In some instances, the topography may be a 2-dimensional topography. In other instances, the topography may be a 3-dimensional topography. The topography may include dimensions of the destination node, and/or surface features of a surface or objects that are "native" to the destination node. In some instances, the topography may describe a surface (e.g., a ground surface) that runs through at least a substantial portion of the destination node. In some instances, the topography may describe a volume with one or more bodies positioned therein (e.g., a simulation of gravity-deprived space with one or more celestial bodies positioned therein).

The above description of the manner in which views of a destination node are determined by destination node module 24 is not intended to be limiting. The destination node module 24 may be configured to express one or more of the destination nodes of the virtual space in a more limited manner. For example, views determined for a given destination node may be selected from a limited set of graphics depicting an event in the given destination node. The views may include additional content (e.g., text, audio, prestored video content, and/or other content) that describes particulars of the current state of the destination node, beyond the relatively generic graphics. For example, a view may include a generic battle graphic with a textual description of the opponents to be confronted. Other expressions of individual destination nodes (and/or dynamic nodes) are contemplated.

Within the destination nodes instanced by destination node module 24, user characters may be controlled by the users to interact with the virtual space. The user characters may include avatars. As used herein, the term "user character" may refer to an object (or group of objects) present in the virtual space that represents an individual user. The user character may be controlled by the user with which it is associated. The user characters may move through and interact with the virtual space (e.g., non-user characters in the virtual space, other objects in the virtual space). The user character associated with a given user may be created and/or customized by the given user. The user character may be associated with an "inventory" of virtual goods and/or currency that the user can use (e.g., by manipulation of the user character and/or the items) within the virtual space.

The users may participate in the virtual space by controlling user characters in the destination nodes (and/or the dynamic nodes discussed herein). Control may be exercised through control inputs and/or commands input by the users through client computing platforms 14.

The dynamic node module 26 may be configured to execute instances of dynamic nodes within the virtual space. The dynamic node module 26 may implement the instances of the dynamic nodes to determine views of the dynamic nodes for presentation to the user via dynamic node module 26. Similar to operation of destination node module 24 in instancing the destination nodes, dynamic node module 26 may be configured such that the dynamic nodes are separate "places" within the virtual space.

Figure 2:
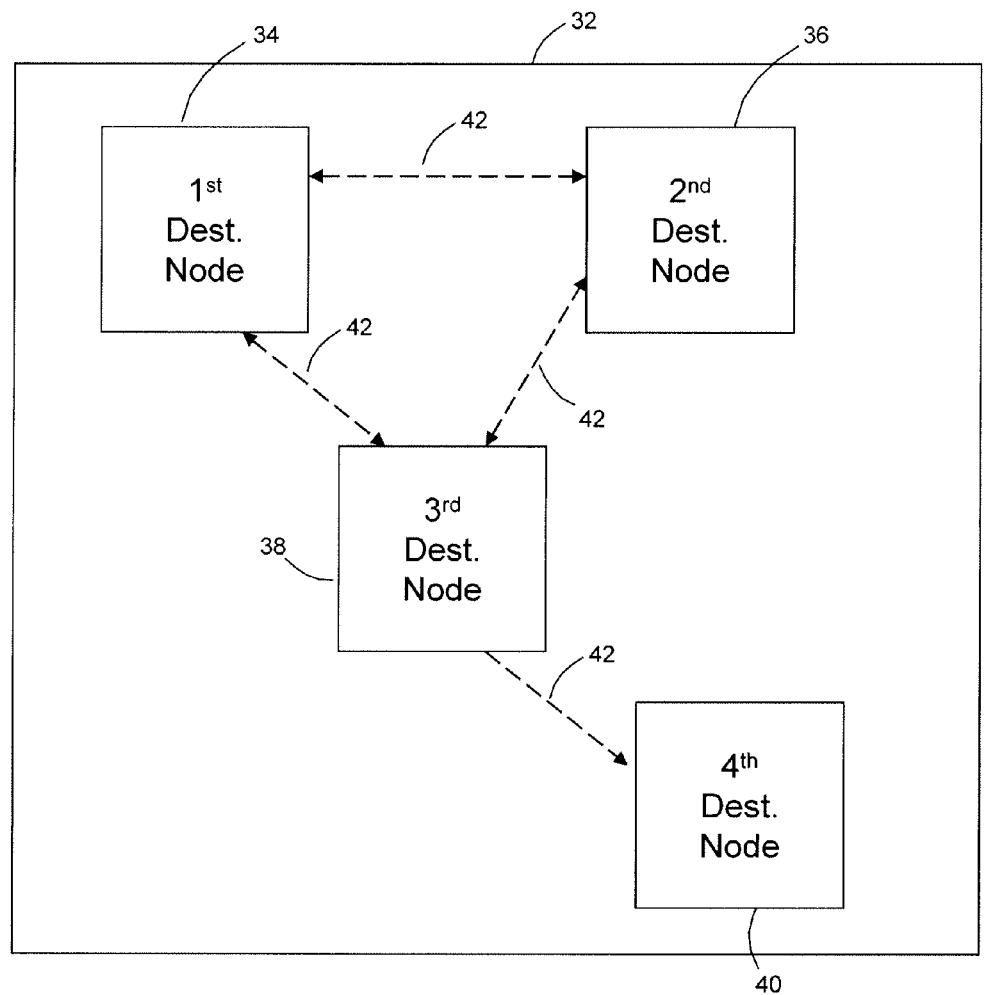
FIG. 2 illustrates a virtual map representing the distribution of destination nodes within a virtual space, according to one or more embodiments of the invention.

The travel interface module 28 may be configured to receive selection or entry of travel commands from the users (e.g., via client computing platforms 16) indicating user characters should travel between destination nodes. As was mentioned above, the destination modes may be arranged within the virtual space in accordance with a virtual map. By way of illustration, FIG. 2 illustrates a virtual map 32 representing the distribution of destination nodes within a virtual space. The destination nodes include a first destination node 34, a second destination node 36, a third destination node 38, and a fourth destination node 40. The destination nodes 34, 36, 38, and 40 may be connected by potential paths 42. As can be seen in FIG. 2, from a given one of the destination nodes 34, 36, 38, and 40, a subset of the other nodes 34, 36, 38, and 40 may be reachable via potential paths 42.

One or more of the potential paths 42 may be unlocked by a user based on gameplay, purchase, availability of a virtual good or object, and/or other criteria. Unlocking one of potential paths 42 based on gameplay may require performance of an objective within the virtual space, obtaining a skill or skill level, obtaining a relationship with another character or characters in the virtual space (e.g., an alliance or friendship), and/or other gameplay. Unlocking one of potential paths 42 based on purchase may require payment of a fee in real world currency, payment of a fee in virtual currency, purchase of a virtual item, object, or equipment, and/or other purchases. Unlocking one of potential paths 42 based on availability of a virtual good or object may require use of a virtual object that provides a power or skill, use of a virtual mount, use of a virtual good or object that acts as a key or pass, and/or use of other virtual goods or objects.

Figure 3:
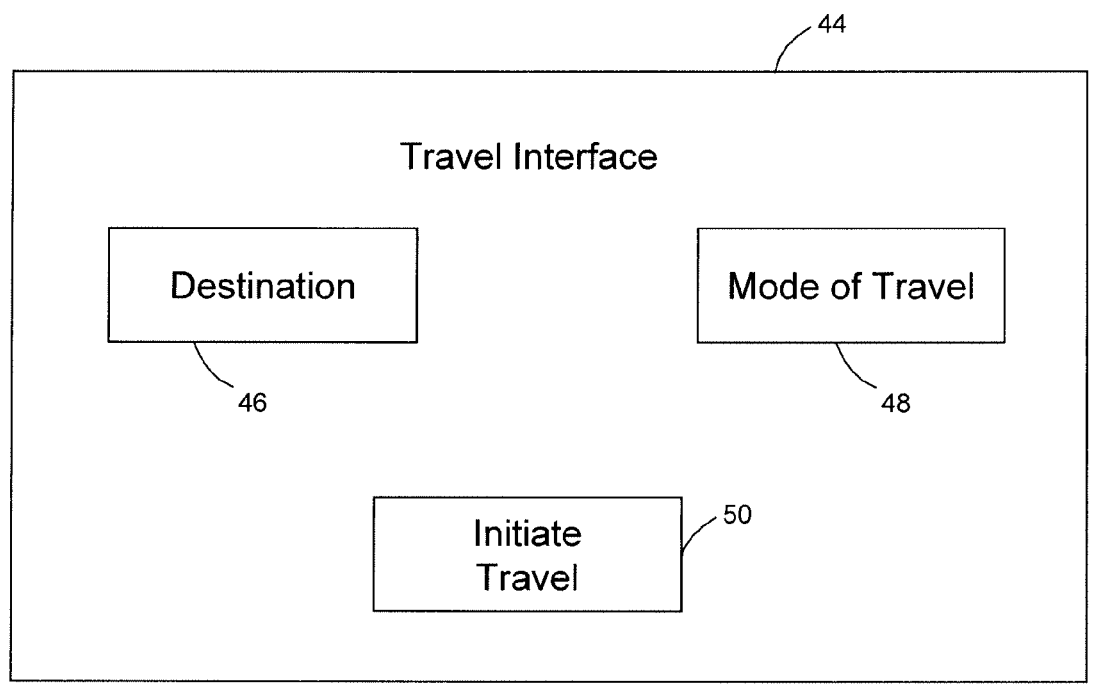
FIG. 3 illustrates a travel interface, in accordance with one or more embodiments of the invention.

Returning now to FIG. 1, travel interface module 28 may be configured such that reception of travel commands is achieved via a travel interface presented to the users through client computing platforms 16. The travel interface may be configured to receive entry or selection of travel commands. The travel commands may be to destination nodes identified in the travel commands. By way of illustration, FIG. 3 depicts a travel interface 44. The travel interface 44 may be presented to a user via a client computing device. For example, the travel interface 44 may be presented as a graphical user interface on an electronic display associated with the client computing platform. The travel interface 44 may include one or more of a destination field 46, a mode of travel field 48, a travel initiation field 50, and/or other fields. The destination field 46 may be configured to receive selection or entry by a user of a destination node to which a user character is to travel. The mode of travel field 48 may indicate a mode of travel that should be used to convey the user character to the selected destination node. The travel initiation field 50 may be configured to receive an indication from the user that travel of the user character toward the destination node should be initiated. The fields 46, 48, and 50 illustrated in FIG. 3 may include one or more of a pull-down menu, a field for manual entry, a selectable button, and/or other interface features for entering and/or selecting commands.

Turning back to FIG. 1, the travel interface module 28 may be configured such that the travel interface presented to a user may reflect the subset of destination nodes available for travel from a current destination node. The subset of destination nodes may be the destination nodes for which potential paths exist with the current destination mode.

The path module 30 may be configured to dynamically determine paths between the destination nodes. Dynamically determining a path between destination nodes may include determining a set of one or more dynamic nodes to include the path between the destination nodes. A path from a first destination node to a second destination node may be determined by path module 30 responsive to reception of a travel command indicating a user character should travel from the first destination node to the second destination node. This determination may be dynamic in that the set of dynamic nodes to be included between the first destination node and the second destination node may vary based on one or more parameters. The parameters may include one or more of a parameter related to the user character, one or more temporal parameters, item(s) possessed by that character, skills gained by that character, levels or ranks attained by that character, an existing or prior relationship with other characters, membership in a character association(s), progress through the game, game specific timing or event conditions surrounding the storyline of the game, modifications or changes to the game environment as part of the game's ongoing storyline, discovery of new path parameters by character's as alternate routes versus existing known node paths, and/or other parameters. A parameter related to the user character may include one or more of skill level, attribute, character type or class, progress in the game, virtual item or object owned or used, previous paths between the first destination node and the second destination node, and/or other parameters. A temporal parameter may include a time of day, a day of the week, a day of the month, a month, and/or other temporal parameters. The dynamic determination of the set of dynamic nodes may be at least partially random.

One or more of the dynamic nodes may be unlocked by a user based on gameplay, purchase, availability of a virtual good or object, and/or other criteria. Unlocking one of the dynamic nodes based on gameplay may require performance of an objective within the virtual space, obtaining a skill or skill level, obtaining a relationship with another character or characters in the virtual space (e.g., an alliance or friendship), and/or other gameplay. Unlocking one of the dynamic nodes based on purchase may require payment of a fee in real world currency, payment of a fee in virtual currency, purchase of a virtual item, object, or equipment, and/or other purchases. Unlocking one of the dynamic nodes based on availability of a virtual good or object may require use of a virtual object that provides a power or skill, use of a virtual mount, use of a virtual good or object that acts as a key or pass, and/or use of other virtual goods or objects.

Figure 4:
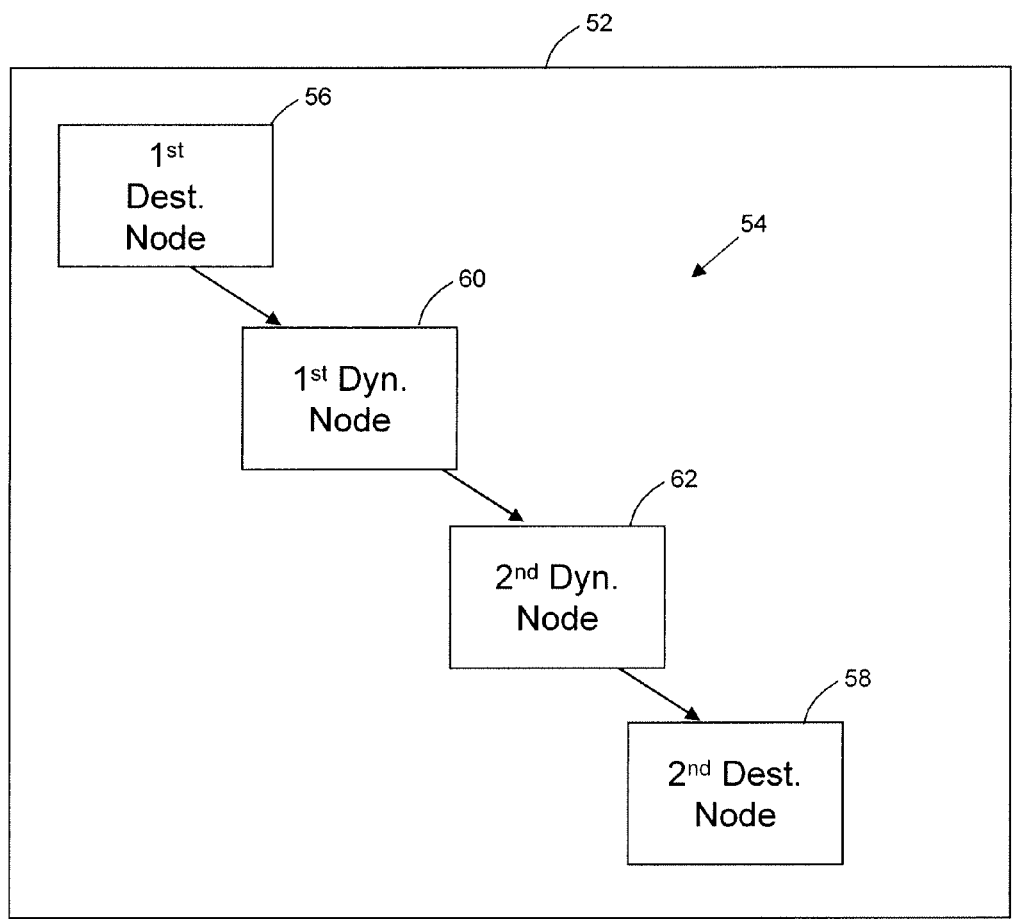
FIG. 4 illustrates a virtual map representing a path between a first destination node and a second destination node, according to one or more embodiments of the invention.

Inclusion of a set of dynamic nodes in the path between the first destination node and the second destination node may result in the user character arriving at the dynamic nodes prior to arriving at the second destination node. By way of illustration, FIG. 4 illustrates a virtual map 52 representing a path 54 between a first destination node 56 and a second destination node 58. The path 54 may include a first dynamic node 60, a second dynamic node 62, and/or other dynamic nodes. As a user character travels along path 54, nodes 60, 62, and finally 58, the virtual space may be non-interactive between the nodes.

As used herein, the term "non-interactive" may refer to areas of the virtual space in which interaction of the user with the virtual space via the user character may be inhibited, restricted, and/or removed. For example, control over the visible expression of the user character (e.g., with respect to movement, direction of travel, interaction with other characters, and/or other aspects of control) may be inhibited, restricted, and/or removed. As another example, experience, points, virtual currency, and/or other rewards for performing tasks may be restricted and/or removed between nodes. This may disincentivize users from controlling user characters to deviate from travel between the nodes. The inhibition, restriction, and/or removal of interactivity between nodes may reduce the processing and/or storage cost of expressing the virtual space to users while the user characters are travelling. In some implementations, travel between nodes may be instantaneous, or may take only the amount of time it takes to determine and distribute a view of the next node.

The dynamic determination of the path may result in paths between the destination nodes 56 and 58 still providing a somewhat dynamic travel experience for the user character even with the inhibited, restricted and/or removed interactivity between nodes. This may enhance the replay and/or continuous play of the virtual space without increasing the processing and/or storage requirements of travel through regions of the virtual space between nodes 56 and 58 to the extent required by maintaining the full interactivity during travel. For example, dynamic determination of the dynamic nodes (e.g., 60 and 62) between nodes 56 and 58 may result in the path between nodes 56 and 58 providing different experiences for different trips.

Referring back to FIG. 1, the path module 30 may be configured such that the path from one destination node to another destination node may include one or more intermediate nodes that are not included based on a dynamic determination of the path. Such intermediate nodes may be included in the path between the destination nodes on every trip of the user character between these nodes (and/or for each trip in the same direction).

The dynamic node module 26 may be configured such that one or more of the dynamic nodes require performance of an objective in order for a user character to continue along a path. Performance of an objective may include, for example, collection of an item or items, defeat of an opponent or opponents, solving a puzzle, acquiring a skill, interacting with a character, or object(s), construction of one or more objects, use of specific language, removal/damaging/destruction/loss of one or more items, specific timed moments in the game story to coincide with game based events, gaining high enough advancement within the game, finding an item(s) or information, and/or performance of other objectives.

Figure 5:
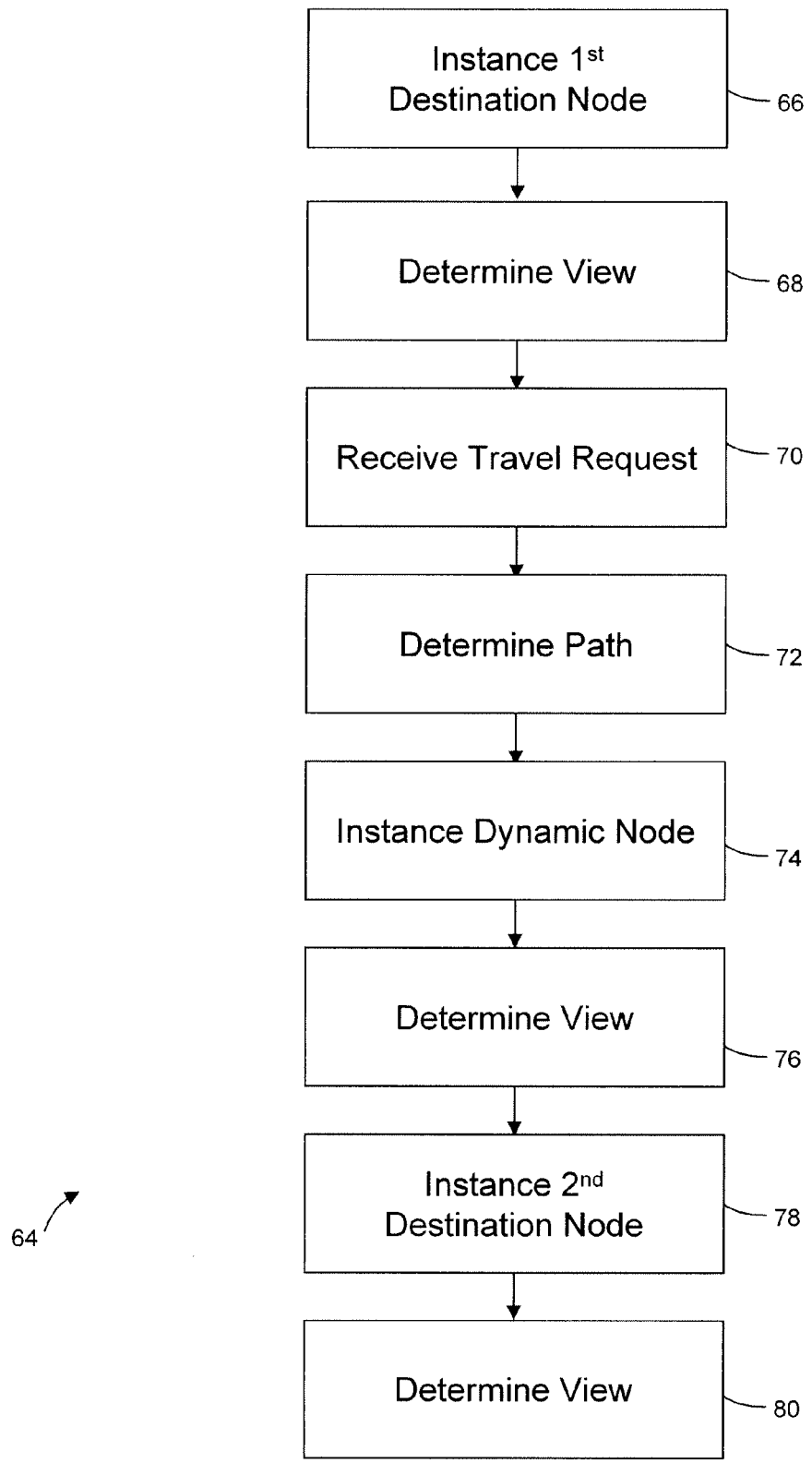
FIG. 5 illustrates a method of hosting a virtual space to a client computing device for interaction by a user, according to one or more embodiments of the invention.

FIG. 5 illustrates a method 64 of hosting a virtual space to a client computing device for interaction by a user. The operations of method 64 presented below are intended to be illustrative. In some embodiments, method 64 may be accomplished with one or more additional operations not described, and/or without one or more of the operations discussed. Additionally, the order in which the operations of method 64 are illustrated in FIG. 5 and described below is not intended to be limiting.

In some embodiments, method 64 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 64 in response to instructions stored electronically on an electronic storage medium. The one or more processing devices may include one or more devices configured through hardware, firmware, and/or software to be specifically designed for execution of one or more of the operations of method 64.

At an operation 66, an instance of a first destination node in the virtual space is executed. In some implementations, operation 66 may be performed by a destination node module that is the same as, or similar to, destination node module 24 (shown in FIG. 1 and discussed herein).

At an operation 68, the instance of the first destination node may be implemented to determine a view of the first destination node for presentation to a user via a client computing device. Operation 68 may be performed responsive to a user character associated with the client computing device being located at the first destination node in the virtual space. In some implementations, operation 68 may be performed by a destination node module that is the same as, or similar to, destination node module 24 (shown in FIG. 1 and discussed herein).

At an operation 70, a travel request may be received from the user. The travel request may be received through a travel interface presented to the user by the client computing device. The travel request may indicate the user character should travel from the first destination node to a second destination node that is separate from the first destination node in the virtual space. In some implementations, operation 70 may be performed by a travel interface module that is the same as, or similar to, travel interface module 28 (shown in FIG. 1 and discussed herein).

At an operation 72, a path of the user character from the first destination node to the second destination node may be determined dynamically. Dynamic determination of the path may include dynamically determining a set of one or more of the dynamic nodes to be included in path of the user character between the first destination node and the second destination node. Operation 72 may be performed responsive to reception of the travel request at operation 70. In some implementations, operation 72 may be performed by a path module that is the same as, or similar to, path module 30 (shown in FIG. 1 and discussed herein).

At an operation 74, an instance of a dynamic node in the virtual space is executed. In some implementations, operation 74 may be performed by a dynamic node module that is the same as, or similar to, dynamic node module 26 (shown in FIG. 1 and discussed herein).

At an operation 76, the instance of the dynamic node may be implemented to determine a view of the dynamic node for presentation to the user via the client computing device. Operation 76 may be performed responsive to a user character associated with the client computing device being located at the dynamic node in the virtual space on the way to the second destination node. In some implementations, operation 76 may be performed by a dynamic node module 26 that is the same as, or similar to, dynamic node module 26 (shown in FIG. 1 and discussed herein).

At an operation 78, an instance of a second destination node in the virtual space is executed. In some implementations, operation 66 may be performed by a destination node module that is the same as, or similar to, destination node module 24 (shown in FIG. 1 and discussed herein).

At an operation 80, the instance of the second destination node may be implemented to determine a view of the second destination node for presentation to the user via the client computing device. Operation 80 may be performed responsive to a user character associated with the client computing device being located at the first destination node in the virtual space. In some implementations, operation 80 may be performed by a destination node module that is the same as, or similar to, destination node module 24 (shown in FIG. 1 and discussed herein).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to host a virtual space to a client computing device for interaction by a user for repeated travel by a particular user character between particular destination nodes within the virtual space, the system comprising:
   a non-transitory machine-readable storage medium configured to store information;
   a user interface configured to receive selection or entry, by the user, of travel commands; and
   one or more hardware processors configured by machine-readable instructions to:
      instance destination nodes within the virtual space, wherein the destination nodes form discrete virtual places within the virtual space in accordance with a virtual map of the virtual space, the destination nodes comprising a first destination node and a second destination node, such that responsive to a user character associated with the client computing device being located at the first destination node the instance of the first destination node is implemented to determine a view of the first destination node for presentation to the user via the client computing device;
      instance dynamic nodes within the virtual space, and to implement the instances of the dynamic nodes to determine views of the dynamic nodes for presentation to the user via the client computing device, wherein individual dynamic nodes form separate virtual places within the virtual space;
      receive selection or entry by the user, through the user interface, of a first travel command indicating the user character should travel between the first destination node and the second destination node;
      dynamically determine paths between the destination nodes to include dynamic nodes such that responsive to reception of the first travel command indicating the user character should travel between the first destination node and the second destination node a first set of one or more of the dynamic nodes to be included in the path of the user character between the first destination node and the second destination node are determined such that the virtual map includes the first set of one or more dynamic nodes between the first destination node and the second destination node, wherein the first set of dynamic nodes includes a first dynamic node having a first objective, wherein the first dynamic node forms a first separate virtual place within the virtual space, and wherein the user character is prevented from proceeding past the first dynamic node toward the second destination node until the first objective has been completed;
      store the first set of dynamic nodes in the electronic storage;
      receive selection or entry by the user, through the user interface, subsequent to completion of the first objective, of a second travel command indicating the user character should travel between the first destination node and the second destination node; and
      determine, responsive to reception of the second travel command, a second set of one or more dynamic nodes to be included in the path of the user character between the first destination node and the second destination node such that the virtual map includes the second set of one or more dynamic nodes between the first destination node and the second destination node, wherein the second set of dynamic nodes includes a second dynamic node having a second objective, wherein the second objective is different than the first objective, wherein the second dynamic node forms a second separate virtual place within the virtual space, and wherein the user character is prevented from proceeding past the second dynamic node toward the second destination node until the second objective has been completed.

2. The system of claim 1, wherein the one or more hardware processors are further configured by machine-readable instructions such that the destination modes are accessible to the user character according to the virtual map, wherein the virtual map includes potential paths between the destination modes, wherein responsive to the user character being located at the first destination mode one or more hardware processors are further configured by machine-readable instructions to receive selection or entry of travel commands indicating the user should travel to one of the destination nodes included in a subset of destination nodes having potential paths with the first destination node.

3. The system of claim 2, wherein the one or more hardware processors are further configured by machine-readable instructions such that the potential paths comprise a first potential path between destination nodes that is unlockable.

4. The system of claim 3, wherein the first potential path is unlockable based on one or both of gameplay or a purchase.

5. The system of claim 1, wherein the one or more hardware processors are further configured by machine-readable instructions to determine which dynamic nodes to include in a path based on parameters associated with the user character.

6. The system of claim 1, wherein the one or more hardware processors are further configured by machine-readable instructions to determine which dynamic nodes to include in a path based on one or more temporal parameters.

7. The system of claim 1, wherein the dynamic nodes do not form discrete places within the virtual space.

8. A computer-implemented method of hosting a virtual space to a client computing device for interaction by a user for repeated travel by a particular user character between particular destination nodes within the virtual space, the method being implemented by a server including a non-transitory machine-readable storage medium and one or more hardware processors configured by machine-readable instructions, the method comprising:

executing, using the one or more hardware processors, an instance of a first destination node and an instance of a second destination node within the virtual space, wherein the first destination node and the second destination node form discrete virtual places within the virtual space in accordance with a virtual map of the virtual space;

responsive to a user character associated with a client computing device being located at the first destination node, implementing, using the one or more hardware processors, the instance of the first destination node to determine a view of the first destination node for presentation to the user via the client computing device;

receiving from the user via the client computing device a first travel command indicating the user character should travel from the first destination node to a second destination node that is separate from the first destination node in the virtual space;

dynamically determining, using the one or more hardware processors, a path of the user character from the first destination node to the second destination node, wherein dynamic determination of the path comprises dynamically determining a first set of one or more dynamic nodes to be included in the path of the user character between the first destination node and the second destination node such that the virtual map includes the first set of one or more dynamic nodes between the first destination node and the second destination node, storing the first set of one or more dynamic nodes in the non-transitory machine-readable storage medium, wherein the path comprises a first dynamic node having a first objective, wherein the first dynamic node forms a first separate virtual place within the virtual space, and wherein the user character is prevented from proceeding past the first dynamic node toward the second destination node until the first objective has been completed;

subsequent to completion of the first objective, receiving from the user via the client computing device a second travel command indicating the user character should travel from the first destination node to the second destination node; and dynamically determining, responsive to reception of the second travel command, a second set of one or more dynamic nodes to be included in the path of the user character between the first destination node and the second destination node such that the virtual map includes the second set of one or more dynamic nodes between the first destination node and the second destination node, wherein the second set of dynamic nodes includes a second dynamic node having a second objective, wherein the second objective is different than the first objective, wherein the second dynamic node forms a second separate virtual place within the virtual space, and wherein the user character is prevented from proceeding past the second dynamic node toward the second destination node until the second objective has been completed.

9. The method of claim 8, wherein prior to receipt of the first travel command the first destination node and the second destination node are connected in the virtual space by a potential path.

10. The method of claim 9, wherein the potential path between destination nodes is unlockable.

11. The method of claim 10, wherein the potential path is unlockable based on one or both of gameplay or a purchase.

12. The method of claim 8, wherein the determination of which dynamic nodes to include in the path is based on parameters associated with the user character.

13. The method of claim 8, wherein the determination of which dynamic nodes to include in the path is based on one or more temporal parameters.

14. The method of claim 8, wherein the individual ones of the one or more dynamic nodes do not form discrete places within the virtual space.

15. A non-transitory machine-readable storage medium having instructions stored thereon causing one or more hardware processors, configured by machine-readable instructions, of a server to perform a method of hosting a virtual space for interaction by a user for repeated travel by a particular user character between particular destination nodes within the virtual space, the method comprising:

executing, using the one or more hardware processors, an instance of a first destination node and an instance of a second destination node within the virtual space, wherein the first destination node and the second destination node form discrete virtual places within the virtual space in accordance with a virtual map of the virtual space;

responsive to a user character associated with a client computing device being located at the first destination node, implementing, using the one or more hardware processors, the instance of the first destination node to determine a view of the first destination node for presentation to the user via the client computing device;

receiving, using the one or more hardware processors, from the user via the client computing device a first travel command indicating the user character should travel from the first destination node to a second destination node that is separate from the first destination node in the virtual space;

dynamically determining, using the one or more hardware processors, a path of the user character from the first destination node to the second destination node, wherein dynamic determination of the path comprises dynamically determining a first set of one or more dynamic nodes to be included in the path of the user character between the first destination node and the second destination node such that the virtual map includes the first set of one or more dynamic nodes between the first destination node and the second destination node, wherein the path comprises a first dynamic node having a first objective, wherein the first dynamic node forms a first separate virtual place within the virtual space, and wherein the user character is prevented from proceeding past the first dynamic node toward the second destination node until the objective has been completed;

subsequent to completion of the first objective, receiving from the user via the client computing device a second travel command indicating the user character should travel from the first destination node to the second destination node; and dynamically determining, using the one or more hardware processors, responsive to reception of the second travel command, a second set of one or more dynamic nodes to be included in the path of the user character between the first destination node and the second destination node such that the virtual map includes the second set of one or more dynamic nodes between the first destination node and the second destination node, wherein the second set of dynamic nodes includes a second dynamic node having a second objective, wherein the second objective is different than the first objective, wherein the second dynamic node forms a second separate virtual place within the virtual space, and wherein the user character is prevented from proceeding past the second dynamic node toward the second destination node until the second objective has been completed.

16. The non-transitory machine-readable storage medium of claim 15, prior to receipt of the first travel command the first destination node and the second destination node are connected in the virtual space by a potential path.

17. The non-transitory machine-readable storage medium of claim 16, wherein the potential path between destination nodes is unlockable.

18. The non-transitory machine-readable storage medium of claim 17, wherein the potential path is unlockable based on one or both of gameplay and/or a purchase.

19. The non-transitory machine-readable storage medium of claim 15, wherein the determination of which dynamic nodes to include in the path is based on parameters associated with the user character.

20. The non-transitory machine-readable storage medium of claim 15, wherein the determination of which dynamic nodes to include in the path is based on one or more temporal parameters.

21. The non-transitory machine-readable storage medium of claim 15, wherein the individual ones of the one or more dynamic nodes do not form discrete places within the virtual space.

* * * * *